United States Patent
Hsiao et al.

[11] Patent Number: 5,891,409
[45] Date of Patent: *Apr. 6, 1999

[54] PRE-CONVERTED NITRIC OXIDE GAS IN CATALYTIC REDUCTION SYSTEM

[75] Inventors: Mark C. Hsiao; Bernard T. Merritt, both of Livermore; Bernardino M. Penetrante, San Ramon; George E. Vogtlin, Fremont, all of Calif.

[73] Assignee: The Regents of the University of California, Oakland, Calif.

[*] Notice: The term of this patent shall not extend beyond the expiration date of Pat. No. 5,711,147.

[21] Appl. No.: 839,895

[22] Filed: Apr. 18, 1997

Related U.S. Application Data

[63] Continuation-in-part of Ser. No. 699,381, Aug. 19, 1996, Pat. No. 5,711,147.

[51] Int. Cl.⁶ .............................. F01N 3/20; B01D 53/34
[52] U.S. Cl. .................................... 423/239.1; 423/213.2; 423/213.7; 422/171; 422/172; 422/177; 60/274; 60/301; 60/303
[58] Field of Search ................................... 422/168–172, 422/174, 177; 423/213.7, 239.1, 213.2; 60/274, 275, 297, 301, 303

[56] References Cited

U.S. PATENT DOCUMENTS

| | | | |
|---|---|---|---|
| 4,954,320 | 9/1990 | Birmingham et al. | 422/186.04 |
| 5,208,205 | 5/1993 | Subramanian et al. | 502/333 |
| 5,236,672 | 8/1993 | Nunez et al. | 422/186.04 |
| 5,424,044 | 6/1995 | Kalka | 422/171 |
| 5,440,876 | 8/1995 | Bayliss et al. | 60/274 |
| 5,474,747 | 12/1995 | Hayashi et al. | 422/177 |
| 5,492,678 | 2/1996 | Ota et al. | 422/174 |
| 5,500,194 | 3/1996 | Bell | 60/274 |
| 5,534,237 | 7/1996 | Yoshida et al. | 423/239.1 |
| 5,711,147 | 1/1998 | Vogtlin et al. | 60/275 |

FOREIGN PATENT DOCUMENTS 2274412 7/1994 United Kingdom.

OTHER PUBLICATIONS

Masakazu Iwamoto, Angel M. Hernandez and Tetsu Zengyo, "Oxidation of NO to $NO_2$ on a Pt–MFI zeolite and subsequent reduction of $NO_x$ by $C_2H_4$ on an In–MFI zeolite: a novel de–$NO_x$ strategy in excess oxygen," Chem. Commun., pp. 37–38, 1997.

Hajo Suhr and Gert Weddigen, "Reduction of Nitric Oxide in Flue Gases by Point to Plane Corona Discharge with Catalytical Coatings on the Plane Electrode," Combust. Sci. and Tech., vol. 72, pp. 101–115 (year???).

B.M. Penetrante, "Plasma Chemistry and Power Consumption in Non–Thermal $DeNO_x$," Non–Thermal Plasma Techniques for Pollution Control Part A–Overview, Fundamentals and Supporting Technologies, pp. 65–89 (1993).

(List continued on next page.)

*Primary Examiner*—Hien Tran
*Attorney, Agent, or Firm*—Alan H. Thompson; Richard B. Main

[57] ABSTRACT

A two-stage catalyst comprises an oxidative first stage and a reductive second stage. The first stage is intended to convert NO to $NO_2$ in the presence of $O_2$. The second stage serves to convert $NO_2$ to environmentally benign gases that include N2, CO2, and $H_2O$. By preconverting NO to $NO_2$ in the first stage, the efficiency of the second stage for $NO_x$ reduction is enhanced. For example, an internal combustion engine exhaust is connected by a pipe to a first chamber. An oxidizing first catalyst converts NO to $NO_2$ in the presence of $O_2$ and includes platinum/alumina, e.g., $Pt/Al_2O_3$ catalyst. A flow of hydrocarbons ($C_xH_y$) is input from a pipe into a second chamber. For example, propene can be used as a source of hydrocarbons. The $NO_2$ from the first catalyst mixes with the hydrocarbons in the second chamber. The mixture proceeds to a second reduction catalyst that converts $NO_2$ to N2, CO2, and $H_2O$, and includes a gamma-alumina $\gamma$-$Al_2O_3$. The hydrocarbons and $NO_x$ are simultaneously reduced while passing through the second catalyst.

4 Claims, 6 Drawing Sheets

OTHER PUBLICATIONS

Bernie M. Penetrante, Mark C. Hsiao, Bernard T. Merritt, George E. Vogtlin, and P. Henrik Wallman, "Comparison of Electrical Discharge Techniques for Nonthermal Plasma Processing of NO in $N_2$," IEEE Transactions of Plasma Science, vol. 23, No. 4, pp. 679–687 (Aug. 1995).

Yoshiaki Kintaichi et al., "Selective Reduction of Nitrogen Oxides with Hydrocarbons over Solid Acid Catalysts in Oxygen–Rich Atmospheres," Catalysis Letters 6 pp. 239–244 (1990).

Hideaki Hamada et al., "Selective reduction of nitrogen monoxide with propane over alumina and HZSM–5 zeolite. Effect of oxygen and nitrogen dioxide intermediate," Applied Catalysis Letter, 70, pp. L15–L20, (1991).

Hideaki Hamada et al., "Transition metal–promoted silica and alumina catalysts for the selective reduction of nitrogen monoxide with propane," Applied Catalysis Letter, 75, pp. L1–L8, (1991).

R. Burch, P.J. Millington, and A.P. Walker, "Mechanism of the Selective Reduction of Nitric Oxide by Propene on Platinum–Based Catalysts in the Presence of Excess Oxygen," Symposium on $NO_x$ Reduction, 207th National Meeting, American Chemical Society, pp. 150–153, San Diego, CA Mar. 13–18, 1994.

Di–Jia Liu and Heinz J. Robota, "in situ XANES Characterization of Cu in Cu–ZSM–5 during Selective Catalytic Reduction of NO by Hydrocarbon," Symposium on $NO_x$ Reduction, 207th National Meeting, American Chemical Society, pp. 107–111, San Diego, CA Mar. 13–18, 1994.

Juan O. Petunchi and W. Keith Hall, "On the role of nitrogen dioxide in the mechanism of the selective reduction of $NO_x$ over Cu–ZSM–5 zeolite," Applied Catalysis Letter B2, pp. L17–L26, (1993).

Hiroyuki Yasuda et al., "IR Study of Catalytic Reduction of Nitrogen Monoxide by Propene in the Presence of Oxygen over Ce–Exchanged ZSM–5 Zeolite," Symposium on $NO_x$ Reduction, 207th National Meeting, American Chemical Society, pp. 199–102, San Diego, CA Mar. 13–18, 1994.

PRE-CONVERTED NITRIC OXIDE GAS IN CATALYTIC REDUCTION SYSTEM

COPENDING APPLICATION

This Application is a continuation-in-part of United States patent application Ser. No. 08/699,381, filed Aug. 19 1996, and titled, PLASMA ASSISTED CATALYTIC REDUCTION SYSTEM, now U.S. Pat. No. 5,711,147. Such application is incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to selective catalytic reduction and more particularly to systems for decomposing $NO_x$ to $N_2$ and $O_2$ in oxygen-rich environments.

2. Description of Related Art

The control of $NO_x$ emissions from vehicles is a worldwide environmental problem. Gasoline engine vehicles can use newly developed three-way catalysts to control such emissions, because their exhaust gases lack oxygen. But so-called "lean-burn" gas engines, and diesel engines too, have so much oxygen in their exhausts that conventional catalytic systems are effectively disabled. Lean-burn, high air-to-fuel ratio, engines are certain to become more important in meeting the mandated fuel economy requirements of next-generation vehicles. Fuel economy is improved since operating an engine stoichiometrically lean improves the combustion efficiency and power output. But excessive oxygen in lean-burn engine exhausts can inhibit $NO_x$ removal in conventional three-way catalytic converters. An effective and durable catalyst for controlling $NO_x$ emissions under net oxidizing conditions is also critical for diesel engines.

According to a report published February 1992 by the U.S. Environmental Protection Agency, (Office of Air and Radiation, Office of Air Quality Planning and Standards, Research Triangle Park, N.C. 27711), there are, in general, four approaches to controlling $NO_x$ emissions from combustion sources. For example, controlling $NO_x$ formation by modifying the combustion operating conditions, by modifying the combustion equipment, by fuel switching, and by postcombustion control of $NO_x$ by flue gas treatment. The first three approaches reduce the original formation of $NO_x$. The latter converts the $NO_x$ that was formed to something more benign.

$NO_x$ can be formed during combustion by three fundamentally different mechanisms, e.g., thermal $NO_x$, fuel $NO_x$, and prompt $NO_x$. Thermal $NO_x$ results from the thermal fixation of molecular nitrogen and oxygen in the combustion air, and its formation is extremely sensitive to the local flame temperature and, to a lesser extent, to the local oxygen concentrations. Virtually all thermal $NO_x$ is formed in the region of the flame at the highest temperature. Maximum thermal $NO_x$ production occurs at a slightly lean fuel-to-air ratio due to the excess availability of oxygen for reaction within the hot flame zone. Control of local flame fuel-to-air ratio is critical in achieving reductions in thermal $NO_x$.

In general, the control mechanisms available for reducing the formation of thermal $NO_x$ include reducing the local nitrogen concentrations at peak temperature, reducing the local oxygen concentrations at peak temperature, reduction of the residence time at peak temperature, and reducing the peak temperature itself.

Fuel $NO_x$ derives from the oxidation of organically bound nitrogen in fuels such as coal and heavy oil, and its formation rate is strongly affected by the rate of mixing of the fuel and air, in general, and by the local oxygen concentration in particular. Typically, the flue gas $NO_x$ concentration from the oxidation of fuel nitrogen is a fraction of the level that would result from complete oxidation of all nitrogen in the fuel. Although fuel $NO_x$ emissions tend to increase with increasing fuel nitrogen content, the emission's increase is not proportional. Fuel $NO_x$ and thermal $NO_x$ formation are each dominated by the local combustion conditions. Fuel-bound nitrogen occurs in coal and petroleum fuels, and the nitrogen-containing compounds in petroleum tend to concentrate in the heavy resin and asphalt fractions during distillation. Little or no fuel $NO_x$ formation is observed when burning natural gas and distillate oil. Reducing fuel $NO_x$ formation for high nitrogen fuels involves introducing the fuel with a sub-stoichiometric amount of air, e.g., a "rich" fuel-to-air ratio. Fuel-bound nitrogen is released in a reducing atmosphere as molecular nitrogen ($N_2$), rather than being oxidized to $NO_x$. The balance of the combustion air enters above or around the rich flame in order to complete combustion. Therefore, controlling excess oxygen is an important part of controlling $NO_x$ formation.

Prompt $NO_x$ is produced after first forming an intermediate hydrogen cyanide (HCN) via the reaction of nitrogen radicals and hydrocarbons in the fuel and then by oxidation of HCN to NO. The formation of prompt $NO_x$ has a weak temperature dependence and a short lifetime of several microseconds and is only significant in very fuel-rich flames which are inherently low-$NO_x$ emitters.

The rates of formation of both thermal and fuel $NO_x$ are dependent on the combustion conditions, so modifications of combustion operating conditions can have a substantial impact on the formation of $NO_x$. The combustion conditions can be tuned by lowering excess air and adjusting the burner settings and air distribution. Overfire air ports, flue gas recirculation systems, and/or low-$NO_x$ burners are also conventional.

Conventional combustion processes typically input some excess air to ensure that all fuel molecules will be oxidized. Low excess air (LEA) systems supply less air than normal to a combustor such that the lower oxygen concentration in the burner zone will reduce the fuel nitrogen conversion to $NO_x$. Fuel-bound nitrogen is converted to $N_2$, thus reducing formation of fuel $NO_x$. The approach is limited by increased carbon monoxide and smoke emissions and reductions in flame stability. Adjusting air registers, fuel injector positions, and overfire air dampers can be used to reduce the minimum excess air level possible. LEA controls require closer operator attention to ensure safe operation; and continuous LEA operations require the use of continuous oxygen and carbon monoxide monitoring, air and fuel flow controls, and instrumentation for adjusting the air flow at various loads.

Off-stoichiometric, or staged combustion, methods create a fuel-rich combustion zone for the initial combustion. The combustion is then completed at lower temperatures in a second, fuel-lean zone. Sub-stoichiometric oxygen is introduced with the primary combustion air into a high temperature, fuel-rich zone to reduce the fuel and thermal $NO_x$ formation. Because the combustion in the secondary zone is conducted at a lower temperature, the thermal $NO_x$ formation is reduced.

Flue gas recirculation (FGR) and exhaust gas recirculation (EGR) recycle a portion of flue gas back to the primary combustion zone to reduce $NO_x$ formation two ways. Heating the inert recycled flue gas combustion products in the primary combustion zone lowers the peak flame temperature, thereby reducing thermal $NO_x$ formation. The thermal $NO_x$ formation is reduced by lowering the oxygen concentration in the primary flame zone. The recycled flue gas can be pre-mixed with the combustion air or injected directly into the flame zone. FGR is limited by the decrease in flame temperature that alters the distribution of heat and lowers fuel efficiency, and FGR only reduces thermal $NO_x$, so the technique is primarily used for natural gas or distillate oil combustion.

Reduced air preheat is limited to equipment with combustion air preheaters and can be implemented by bypassing all or a fraction of the flue gas around the preheater, thereby reducing the combustion air temperature. Reducing the amount of combustion air preheat lowers the primary combustion zone peak temperature, thereby reducing thermal $NO_x$ formation. Because the beneficial effects are limited to the reduction of thermal $NO_x$, this approach is economically attractive for only natural gas and distillate fuel oil combustion. Although $NO_x$ emissions decrease significantly with reduced combustion air temperature, significant loss in efficiency will occur if flue gas temperatures leaving the stack are increased as a consequence of bypassing the air preheaters. Enlarging the surface area of existing economizers or installation of an economizer in place of an air preheater can be used to partially recover the heat loss.

In-furnace $NO_x$ reduction or staged fuel injection uses the furnace zone, e.g., the post-combustion, preconvection section for reburning. The burner zone products are passed through a secondary flame or fuel-rich combustion process. A fraction of the fuel is diverted for a secondary flame or fuel rich-zone downstream of the primary combustion zone burner. Sufficient air is then supplied to complete the oxidation process.

Steam or water can be injected into the combustion zone to decrease the flame temperature and thereby reduce the thermal $NO_x$ formation by acting as a thermal ballast. So it is important that such ballast reach the primary flame zone, e.g., by mixing the steam or water into the fuel, combustion air, or injecting the steam or water into the combustion chamber.

Catalytic combustion techniques place a special catalyst coating on a solid surface close to a combustion process. Such catalysts accelerate the chemical reactions and substantial burning can be achieved, even at low temperatures, thereby reducing the formation of $NO_x$. The catalyst serves to sustain the overall combustion process and minimizes stability problems. Catalytic combustion can be effective in reducing $NO_x$ emissions, as well as emissions of carbon monoxide and unburned hydrocarbons.

Conventional catalysts seriously degrade at high temperatures, e.g., above 1000° C. (1830° F.), and have largely been used in gas turbines.

Injection-type engines, such as diesel and many dual-fuel and natural gas engines, can adjust the air-to-fuel ratio for each cylinder. Such engines are usually operated lean; because the combustion is more efficient and results in better fuel economy. As the oxygen availability increases, the capacity of the air and combustion products to absorb heat also increases, reducing the peak temperatures and lowering the $NO_x$ formation. The limiting factor for lean operation is the increased emissions of hydrocarbons that result at the lower temperatures.

Ignition timing retard is a $NO_x$ control technique that is applicable to internal combustion (IC) engines. Ignition in a normally adjusted IC engine is set to occur shortly before the piston reaches its uppermost position (top dead center, or TDC). At TDC, the air or air-fuel mixture is at maximum compression and power output and fuel consumption are optimum. Retarding causes more of the combustion to occur during the expansion stroke, thus lowering peak temperature, pressure, and residence time. Typical retard values range from 2° to 6°, depending upon the engine. Beyond these levels fuel consumption increases rapidly, power drops, and misfiring occurs.

Flue gas treatment reduces $NO_x$ in the flue gas downstream of the combustion zone or by treatment in a boiler unit and can be used in combination with other combustion operation or equipment modifications. Flue gas treatment systems are classified as selective or non-selective, depending on whether they selectively reduce $NO_x$ or simultaneously reduce $NO_x$, unburned hydrocarbons, and carbon monoxide.

Selective catalytic reduction (SCR) systems usually use ammonia to reduce $NO_x$ to $N_2$. Ammonia diluted with air or steam is injected through a grid into a flue gas stream upstream of a catalyst bed, such as vanadium, titanium, or platinum-based enclosed in a reactor. The ammonia reacts on the catalyst surface with $NO_x$ to form molecular nitrogen and water and is favored by the presence of excess oxygen. The $NO_x$ reduction is primarily dependent on temperature. A given catalyst will exhibit optimum performance within a temperature range of plus or minus 28° C. (50° F.) where flue gas oxygen concentrations exceed one percent. Below this, the catalyst activity is greatly reduced, thus allowing some unreacted ammonia to slip through. Above the optimum temperature range, the ammonia itself will be oxidized to form additional $NO_x$. Excessive temperatures may also damage the catalyst.

Non-selective catalytic reduction (NSCR) systems reduce $NO_x$ by a using a catalyst to react the carbon monoxide in the flue gas to form $N_2$ and carbon dioxide. Such catalysts used usually include a mixture of platinum and rhodium. But certain oil additives, e.g., phosphorus and zinc, can result in catalyst poisoning.

Selective non-catalytic reduction (SNCR) systems selectively reduce $NO_x$ without resorting to the use of catalysts. In a system developed by Exxon (Thermal DeNO$_x$), gaseous ammonia ($NH_3$) is injected into the air-rich flue gas to reduce $NO_x$ to $N_2$. In a process developed by the Electric Power Research Institute ($NO_x$OUT), a urea-type compound or amine salt is injected into the oxygen-rich and/or high temperature convection section of a boiler to promote $NO_x$ reduction. The exact chemical mechanism is not fully understood but involves the decomposition of urea ($C(NH_2)_2O$) and the reduction of NO by reaction with $NH_2$. The temperature is used to control the selective reactions in both systems.

Catalysts that have the activity, durability, and temperature window required to effectively remove $NO_x$ from the exhaust of lean-burn engines are unknown. Prior art lean-$NO_x$ catalysts are hydrothermally unstable. A noticeable loss of activity occurs after relatively little use, and even such catalysts only operate over very limited temperature ranges. Conventional catalysts are therefore inadequate for lean-burn operation and ordinary driving conditions.

Catalysts that can effectively decompose $NO_x$ to $N_2$ and $O_2$ in oxygen-rich environments have not yet been developed, although it is a subject of considerable research.

But see, U.S. Pat. No. 5,208,205, issued May 4, 1993, to Subramanian, et al. An alternative is to use catalysts that selectively reduce $NO_x$ in the presence of a co-reductant, e.g., selective catalytic reduction (SCR) using ammonia as a co-reductant.

Using co-existing hydrocarbons in the exhaust of mobile lean-burn gasoline engines as a co-reductant is a more practical, cost-effective, and environmentally sound approach. The search for effective and durable SCR catalysts that work with hydrocarbon co-reductants in oxygen-rich environments is a high-priority issue in emissions control and the subject of intense investigations by automobile and catalyst companies, and universities, throughout the world.

SCR catalysts that selectively promote the reduction of $NO_x$ under oxygen-rich conditions in the presence of hydrocarbons are known as lean-$NO_x$ catalysts. More than fifty such SCR catalysts are conventionally known to exist. These include a wide assortment of catalysts, reductants, and conditions. Unfortunately, just solving the problem of catalyst activity in an oxygen-rich environment is not enough for practical applications. Like most heterogeneous catalytic processes, the SCR process is susceptible to chemical and/or thermal deactivation. Many lean-$NO_x$ catalysts are too susceptible to water vapor and high temperatures. As an example, the Cu-zeolite catalysts deactivate irreversibly if a certain temperature is exceeded. The deactivation is accelerated by the presence of water vapor in the stream. In addition, water vapor suppresses the NO reduction activity even at lower temperatures.

The problems encountered in lean-$NO_x$ catalysts include lessened activity of the catalyst in the presence of excessive amounts of oxygen, reduced durability of the catalyst in the presence of water, sulfur, and high temperature exposure, and narrow temperature windows in which the catalyst is active. Practical lean-$NO_x$ catalysts must overcome all three problems simultaneously before they can be considered for commercial use.

Lean-burn engine exhausts have an excessive amount of oxygen that renders conventional three-way catalytic converters useless for $NO_x$ removal. The excess oxygen adsorbs preferentially on the precious metal, e.g., Pt, Rh, and Pd, surfaces in the catalyst, and inhibits a chemical reduction of $NO_x$ to $N_2$ and $O_2$. A wide variety of catalysts and reductants are known to promote lean-$NO_x$ catalysis, however, all such catalysts have proven to be susceptible to chemical and/or thermal deactivation. Another major hurdle for commercialization of the current lean-$NO_x$ catalysts is the lack of durability in catalysts to the effects of high-temperature water vapor, which is always present in engine exhaust. Conventional lean-$NO_x$ catalysts are hydrothermally unstable and lose activity after only a short operation time.

Some gasoline can contain up to 1200 ppm of organosulfur compounds. These convert to $SO_2$ and $SO_3$ during combustion. Such $SO_2$ will adsorb onto the precious metal sites at temperatures below 300° C. and thereby inhibits the catalytic conversions of CO, $C_xH_y$ (hydrocarbons) and $NO_x$. At higher temperatures with an $Al_2O_3$ catalyst carrier, $SO_2$ is converted to $SO_3$ to form a large-volume, low-density material, $Al_2(SO_4)_3$, that alters the catalyst surface area and leads to deactivation. In the prior art, the only solution to this problem offered has been to use of fuels with low sulfur contents.

Another major source of catalyst deactivation is high temperature exposure. This is especially true in automobile catalysts where temperatures close to 1000° C. can exist. The high-temperatures attack both the catalyst precious metal and the catalyst carrier, e.g., gamma alumina ($\gamma$-$Al_2O_3$). Three-way catalysts are comprised of about 0.1 to 0.15 percent precious metals on a $\gamma$-$Al_2O_3$ wash coat, and use $La_2O_3$ and/or BaO for a thermally-stable, high surface area $\gamma$-$Al_2O_3$. Even though the precious metals in prior art catalysts were initially well dispersed on the $\gamma$-$Al_2O_3$ carrier, they were subject to significant sintering when exposed to high temperatures. This problem, in turn, led to the incorporation of certain rare earth oxides such as $CeO_2$ to minimize the sintering rates of such precious metals.

Because of the remarkable success that has been achieved in the use of modifiers for improving the durability of the modern catalytic converters, this same approach is being used in the attempt to improve the durability of lean-$NO_x$ catalysts. Much effort has therefore been devoted to the use of modifiers to improve the stability of lean-$NO_x$ catalysts in the simultaneous presence of water, $SO_2$, and high temperature exposure. However, the results are still far from being satisfactory.

The U.S. Federal Test Procedure for cold starting gasoline fueled vehicles presents a big challenge for lean-$NO_x$ catalysts due to the low-temperature operation involved. Diesel passenger car applications are similarly challenged by the driving cycle that simulates slow-moving traffic. Both tests require reductions of CO, hydrocarbons, and $NO_x$ at temperatures below 200° C. when located in the under-floor position. Modifications of existing catalyst oxidation technology are successfully being used to address the problem of CO and hydrocarbon emissions, but no prior art solution exists for $NO_x$.

SUMMARY OF THE INVENTION

An object of the present invention is to provide a method for reducing $NO_x$ emissions.

A further object of the present invention is to provide a vehicle with reduced $NO_x$ emissions.

A still further object of the present invention is to provide a system for attachment to an engine with an oxygen rich exhaust for the reduction of $NO_x$ emissions.

Briefly, a $NO_x$ emissions reducer embodiment of the present invention comprises a non-thermal plasma gas treatment combined with selective catalytic reduction to enhance $NO_x$ reduction in oxygen-rich vehicle engine exhausts.

An advantage of the present invention is that a method for $NO_x$ emission reduction is provided that is inexpensive and reliable. A plasma-assisted catalytic reduction (plasma-assisted catalytic reduction) process improves the activity, durability, and temperature window of catalysts. The plasma-assisted catalytic reduction may allow the use of precious metal catalysts to be avoided for relatively inexpensive compliance to $NO_x$ emission reduction laws.

Another advantage of the present invention is that a system is provided for reducing $NO_x$ emissions.

DETAILED DESCRIPTION OF THE INVENTION

Figure 1:
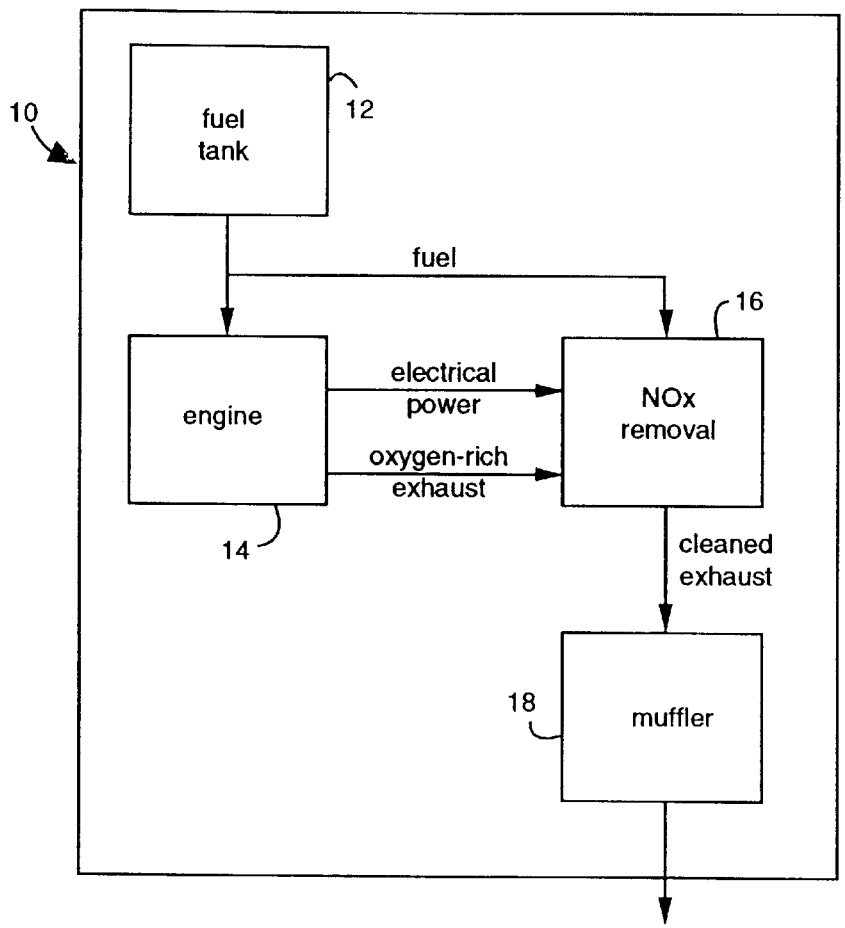
FIG. 1 is a function block diagram of a vehicle embodiment of the present invention.

FIG. 1 illustrates a vehicle embodiment of the present invention, and is referred to herein by the general reference numeral 10. The vehicle 10 is provided with a fuel tank 12 that supplies an internal combustion engine 14 and a $NO_x$ reduction unit 16. The fuel used may be #2 diesel oil and the engine 14 may be a diesel type common to busses and trucks. The engine 14 has an output of exhaust gas that is both rich in oxygen and oxides of nitrogen ($NO_x$), e.g., NO and $NO_2$. Oxygen-rich exhausts are typical of diesel engines and lean-burn gasoline engines. Such $NO_x$ in the exhaust is environmentally undesirable. The exhaust and electrical power, e.g., 12–24 VDC stepped up to high voltage, are input to the $NO_x$ reduction unit 16. Hydrocarbons in the fuel and a plasma created by the electrical power provided are used in a two-step conversion of hydrocarbons+NO→$NO_2$ and $NO_2$→$N_2$, $O_2$, $CO_2$ by the $NO_x$ reduction unit 16. A muffler 18 is used to quiet the otherwise noisy cleaned exhaust.

Figure 2:
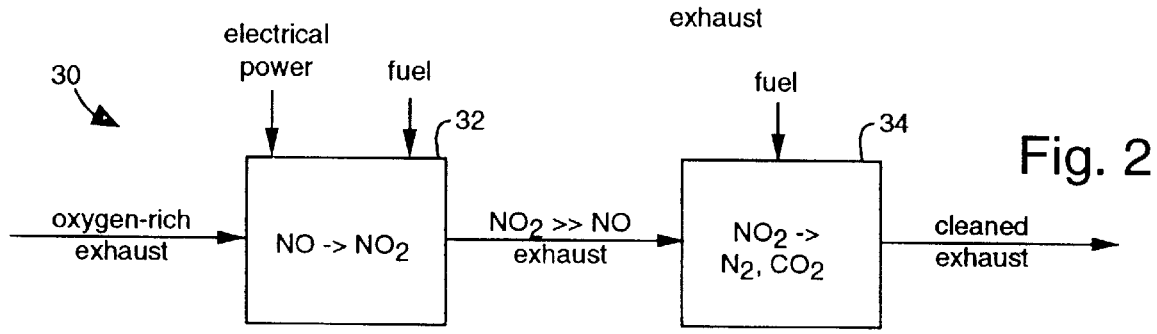
FIG. 2 is a flowchart diagram representing a method of the present invention for $NO_x$ reduction.

FIG. 2 represents a method embodiment of the present invention for $NO_x$ removal in oxygen-rich exhaust flows and is referred to herein by the general reference numeral 30. The $NO_x$ reduction unit 16 of FIG. 1 represents an implementation of the method 30. A step 32 converts the NO in an oxygen-rich exhaust flow to $NO_2$ by mixing hydrocarbon molecules into the oxygen-rich exhaust flow and passing the mixture through a plasma processor or non-thermal electrical oxidizer. Complex hydrocarbons, such as diesel oil, may be reduced to simpler hydrocarbon molecules by cracking the complex hydrocarbon molecules with another plasma processor. The electrical power input is used to drive the plasma processors. In a step 34, a gamma-alumina catalyst is used to convert hydrocarbons and $NO_2$ to more benign products.

Alternatively, a simple hydrocarbon may be supplied to the $NO_x$ reduction unit 16, e.g., propene. Some hydrocarbons may be better reductants or better NO to $NO_2$ promoters. The disadvantage is two different supplies of hydrocarbons must be maintained aboard the vehicle 10.

Figure 3:
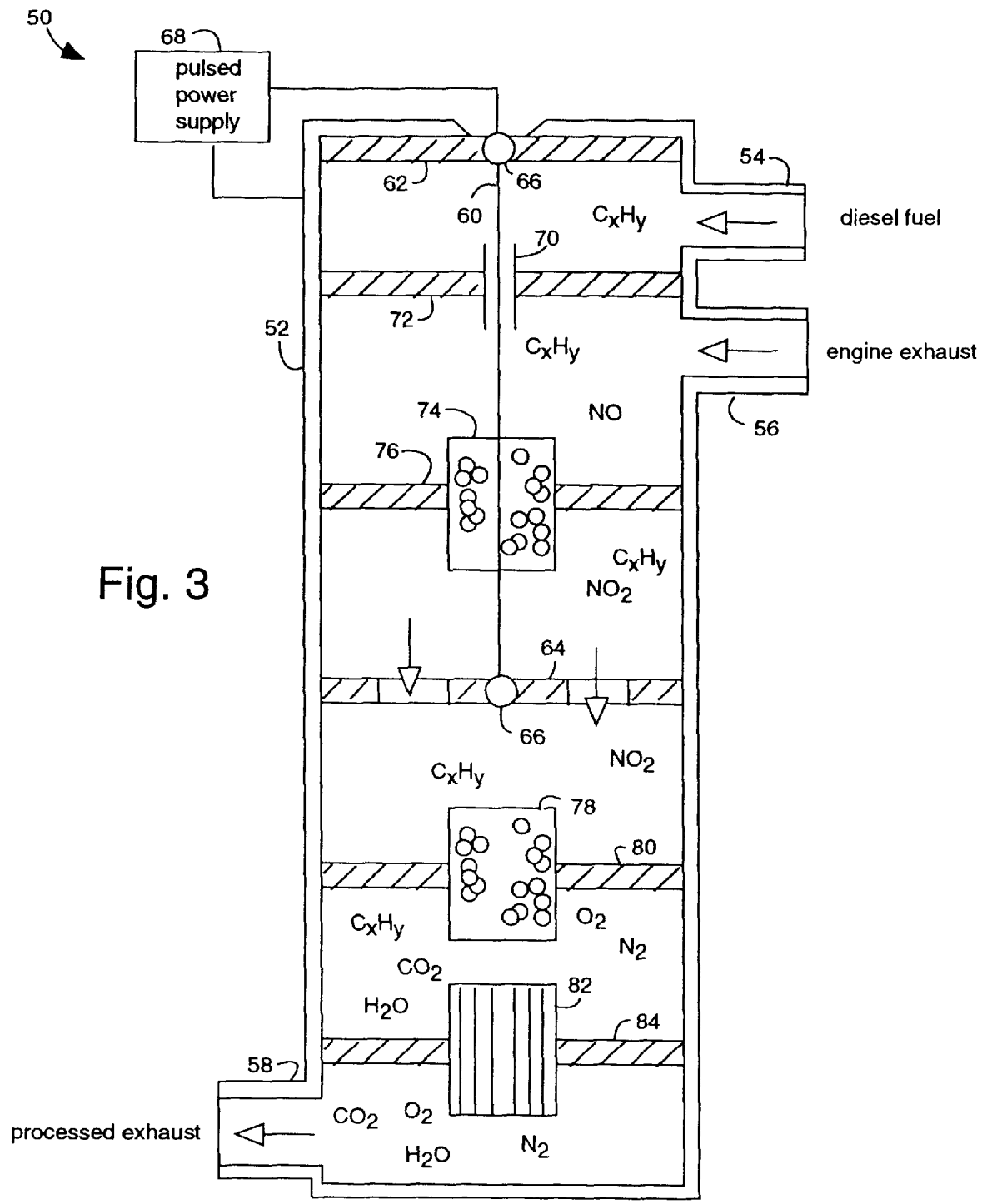
FIG. 3 is a cross sectional diagram representing a $NO_x$ reduction unit embodiment of the present invention.

FIG. 3 diagrams a $NO_x$ reduction unit of the present invention and is referred to herein by the general reference numeral 50. The $NO_x$ reduction unit 50 is similar to the $NO_x$ reduction unit 16 of FIG. 1 and similar in operation to the $NO_x$ reduction method 30 of FIG. 2. The $NO_x$ reduction unit 50 comprises a cylindrical housing 52 with an atomized hydrocarbon inlet 54, an engine exhaust inlet 56 and a processed exhaust outlet 58. The housing 52 need not be cylindrical and can take the form of an exhaust manifold attached to an engine. The higher temperatures afforded by close proximity of the $NO_x$ reduction unit 50 to such engine are preferred. A corona generating wire 60 is concentrically suspended along the axis of the housing 52 between a pair of insulative bulkheads 62 and 64. A number of corona balls 66 are connected at the ends of the wire 60 to prevent electrical breakdown. A pulsed power supply 68 is connected to the corona wire 60 and supplies high-voltage, high-current pulses with variable duty cycles and pulse repetition rates. For example, a voltage of 30,000 volts and a current of 100 amperes with a pulse duration of 100 nanoseconds and a pulse repetition rate of 50–5,000 Hz have provided good results. Such parameters may be made independently variable and microcomputer controlled to accommodate a variety of exhaust flow rates being processed. A preprocessor 70 is constructed as a concentric metal tube that pierces a metal bulkhead 72. The preprocessor 70 cracks the complex hydrocarbons provided from the inlet 54 into simpler hydrocarbons using a non-thermal plasma. The dimensions of the tube and the wire are selected to maintain a field enhancement sufficient to generate the coronal discharge. A stainless steel corona wire 60 with a diameter of 1.5 millimeter and a tube in the preprocessor 70 with an inside diameter of 6.2 centimeters have given good results. If propene or another similar hydrocarbon source is provided to the inlet 54, the preprocessor 70 is unnecessary and may be omitted. A processor 74 held in place by a metal bulkhead 76 uses both the simple hydrocarbons and a non-thermal plasma to convert NO in the flow from the engine exhaust inlet 56 into $NO_2$. A bed of silica beads 4–10 millimeters each in diameter maybe included to help trap and oxidize soot.

The pulsing of the electrical power applied to the corona wire 60 is critically controlled to generate only arc-precursor streamers that bridge the electrode gap within the processor 74 but do not arc. Such a processor is conventional and is variously referred to by artisans as a pulsed corona processor. Alternatively, the corona wire 60 or the inside walls of the processor 74 maybe covered or coated with a dielectric layer to prevent DC arcs. Alternating current electrical power may then be used. Such a processor is known to artisans as a dielectric barrier discharge processor.

A catalytic converter 78 is mounted on a bulkhead 80 and provides for the selective catalytic reduction of $NO_2$ to more environmentally benign molecules, such as $N_2$, $O_2$, $CO_2$ and $H_2O$, using excess hydrocarbons that flow from the processor 74. The catalytic converter 78 may be configured as a bed of gamma alumina pellets, e.g., $\gamma$-$Al_2O_3$. The catalytic converter 78 may also be configured as a wash coat of gamma alumina on a substrate.

An oxidation catalyst 82 is mounted on a bulkhead 84 and provides for the burning of any excess hydrocarbons not consumed by the processor 74 and the catalytic converter 78. Preferably, the flow of hydrocarbons into the inlet 54 is controlled to minimize such excess hydrocarbons that must be burned by the oxidation catalyst 82.

Oxygen enhances the selective catalytic reduction of NO by hydrocarbons. Empirical evidence suggests that the NO, reduction by lean-$NO_x$ catalysts activate the NO by converting it to $NO_2$, either in the gas phase or on the surface. The $NO_2$ will then be reduced on the catalyst surface when in the presence of hydrocarbons. The gas-phase formation of $NO_2$ is argued to be sufficient to account for the observed rate of $NO_x$ reduction by $\gamma$-$Al_2O_3$. Whether the heterogeneous oxidation of NO also takes place is not clear. The functions of the active sites are complicated because a multitude of reactions happen on the surface. There are sites on which the NO may be activated by oxidation to $NO_2$, sites where the hydrocarbon molecule is activated, sites where the carbon oxides are formed, and sites where the coupling of nitrogen-containing molecules take place. Individual sites may be involved in more than one step, or there may be two or more different sites in close proximity acting as a multifunctional catalyst.

Catalysts that are active in selective catalytic reduction of NO by hydrocarbons have surface acidity, e.g., they possess surface hydroxyl groups. The simplest surface on which selective catalytic reduction by hydrocarbons is observed is the amorphous, acidic form of alumina, known as $\gamma$-$Al_2O_3$. In addition to having the best physical surface structure, e.g. surface area of 100–200 square meters per gram, $\gamma$-$Al_2O_3$ is also the most acidic form of stable alumina.

In the case of oxide-based catalysts, the deactivation of catalyst activity by water vapor may be related to the effect of polar water molecules on certain acidic centers in the catalyst. The deactivation by water is thus pronounced for catalysts in which the acid sites play an active role in NO oxidation, as in producing the important $NO_2$ intermediate. In some catalysts, acid sites are active for NO oxidation, and thus is rate-limiting. Once the NO oxidation sites are deactivated, the catalyst as a whole loses competitiveness for hydrocarbon reduction of $NO_x$ versus hydrocarbon combustion by oxygen, thereby leading to inefficient $NO_x$ removal.

Oxidizing NO to $NO_2$ with a plasma allows the catalyst itself to be devoted exclusively to the selective reduction of $NO_2$ by the hydrocarbons. The plasma uses the hydrocarbons to enhance the oxidation of NO to $NO_2$. In a catalyst, hydrocarbon helps reduce $NO_2$ to $N_2$. Such plasma-assisted catalytic reduction, may be expressed schematically in two steps, e.g., (1) plasma+NO+$O_2$+HC→$NO_2$+HC breakup products, and (2) catalyst+$NO_2$+HC→$N_2$+$CO_2$+$H_2O$, where HC refers to hydrocarbon molecules.

The plasma oxidizes the NO to $NO_2$ in the first step. And the second step breaks the original hydrocarbons into smaller molecules and radicals that could significantly enhance the activity of the catalyst. Thus there is great synergy in combining the plasma with the catalyst.

Since many lean-$NO_x$ catalysts are more active to $NO_2$, compared to NO, a preconversion of NO to $NO_2$ in the plasma is needed to increase the overall $NO_x$ reduction efficiency. The hydrocarbons are used to enhance the NO oxidation process in the plasma, and the hydrocarbons are required for the chemical reduction of $NO_2$ on the catalyst surface.

The plasma-assisted catalytic reduction process is a non-thermal plasma type of atmospheric-pressure plasma. See, M. Penetrante and S. E. Schultheis, Springer-Verlag, Berlin Heidelberg, 1993. A plasma is produced in which a majority of the electrical energy goes into the production of energetic electrons, rather than gas heating. Electron-impact dissociation and ionization of the background gas molecules allows energetic electrons to be used to produce free radicals, ions and additional electrons which, in turn, oxidize, reduce or decompose pollutant molecules.

The plasma-assisted catalytic reduction process improves the activity and durability of catalysts for $NO_x$ reduction in lean-burn engine exhaust, and enables the use of catalysts that may not require precious metals. The present inventors understand that the plasma is being used to oxidize NO to $NO_2$ and the catalyst which follows is being used to convert the $NO_2$ and hydrocarbons to $N_2$, $CO_2$ and $H_2O$.

The activity for selective catalytic reduction is significantly higher for $NO_2$ compared to that for NO. The relatively higher activity for $NO_2$ has been observed in Cu-ZSM-5 zeolite catalysts. It has also been observed in oxide catalysts consisting simply of $\gamma$-$Al_2O_3$. The selective catalytic reduction activity of a $\gamma$-$Al_2O_3$ catalyst has been verified in experiments.

Figure 4:
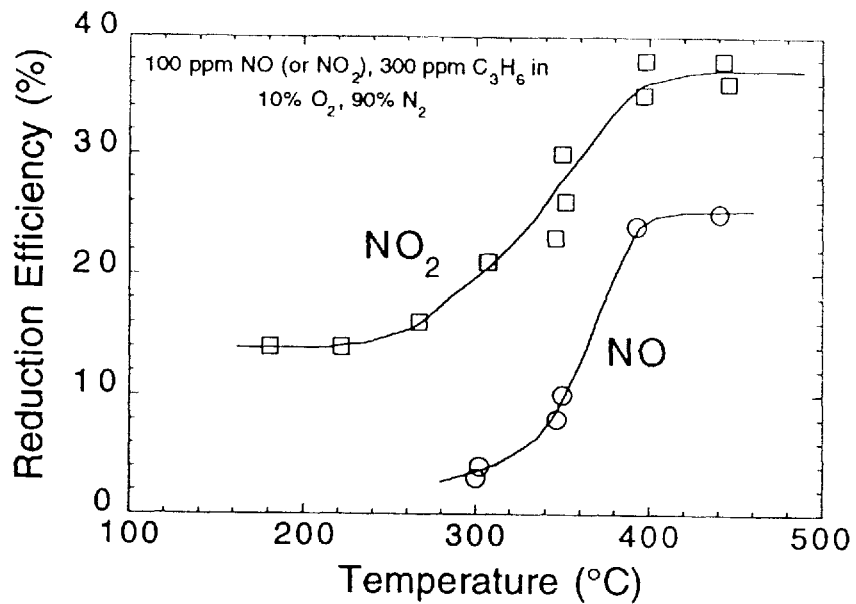
FIG. 4 is a graph showing $NO_x$ reduction efficiency by a g-$Al_2O_3$ catalyst as a function of temperature, comparing the two cases where the inlet $NO_x$ is either NO or $NO_2$. The inlet gas concentrations were 100 ppm NO (or $NO_2$), 300 ppm $C_3H_6$ in 10% $O_2$, 90% $N_2$.

In FIG. 4, the amount of total $NO_x$ reduction was compared with the inlet $NO_x$ being either NO or $NO_2$, and using propene as the reductant. The catalyst consisted simply of pellets of pure $\gamma$-$Al_2O_3$. The reduction efficiency of the catalyst was higher for $NO_2$ compared to that of NO, e.g., with using a plasma. The $NO_x$ reduction is attributed entirely to the catalyst. The concentrations of NO and $NO_2$ were detected and quantified by both chemiluminescence and infrared absorbance. The $NO_x$ reduction is presumably due to $N_2$, since the amount of $N_2O$ and any other oxides of nitrogen, like $HONO_2$, is negligible compared to the reduction in $NO_x$ concentration. The maximum $NO_x$ reduction efficiency shown in FIG. 4 could be increased by increasing the amount of $\gamma$-$Al_2O_3$ and/or decreasing the gas flow rate.

The hydrocarbon-enhanced oxidation of NO to $NO_2$ in a plasma appears to have been verified in experiments. The figures will show the concentrations of NO and $NO_2$ as functions of the electrical energy density applied to the plasma, e.g., electrical power input divided by the total gas flow rate. The processes that determine the concentrations of NO and $NO_2$ can be attributed entirely to reactions in the gas phase. The plasma was produced by a pulsed corona reactor, which consisted simply of a wire in a metal pipe. The plasma reactor was driven by a pulsed high-voltage power supply.

The electrons in the plasma lead to two important dissociation processes, $$e+N_2 \rightarrow e+N+N, \text{ and} \tag{1}$$

$$e+O_2 \rightarrow e+O+O. \tag{2}$$

The nitrogen atoms produced in electron-impact reaction (1) can lead to the desirable chemical reduction of NO via the reaction, $$N+NO \rightarrow N_2+O. \tag{3}$$

The oxygen atoms produced in electron-impact reaction (2) leads to the chemical oxidation of NO to $NO_2$, $$O+NO+M \rightarrow NO_2+M, \tag{4}$$

where M is any molecule acting as a third body reactant.

In mixtures containing 5% or more $O_2$, as in lean-burn engine exhausts, analyses of the electron-molecule collision cross sections have shown that the probability for dissociation of $O_2$ is much higher than that for dissociation of $N_2$. The oxidation reaction (4) dominates over the reduction reaction (3).

Figure 5:
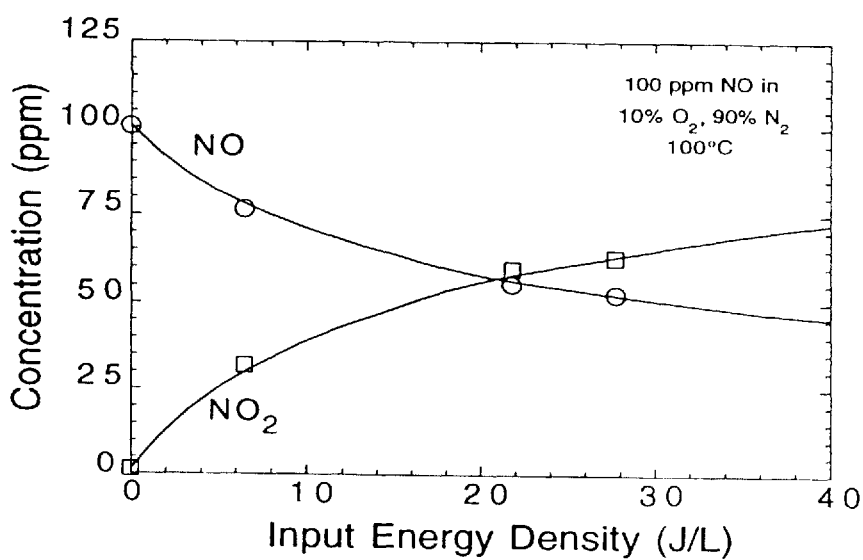
FIG. 5 is a graph showing the effect of plasma processing on the NO and $NO_2$ concentrations, at a gas temperature of 100° C. The concentrations are shown as functions of the electrical energy density (in units of Joules per standard liter of exhaust gas) applied to the plasma. The inlet gas concentrations were 100 ppm NO in 10% $O_2$, 90% $N_2$.

Experimental evidence for such is shown in FIG. 5 for a gas temperature of 100° C. A decrease in NO concentration can be attributed entirely to oxidation to $NO_2$. For gas temperatures around 300° C. or more, which are more typical of engine exhausts, another reaction becomes important, $$O + NO_2 \rightarrow NO + O_2. \quad (5)$$

Reaction (5) will compete with reaction (4) when the gas temperature is high. The net result is a decrease in the amount of NO that can be oxidized to $NO_2$.

Figure 6:
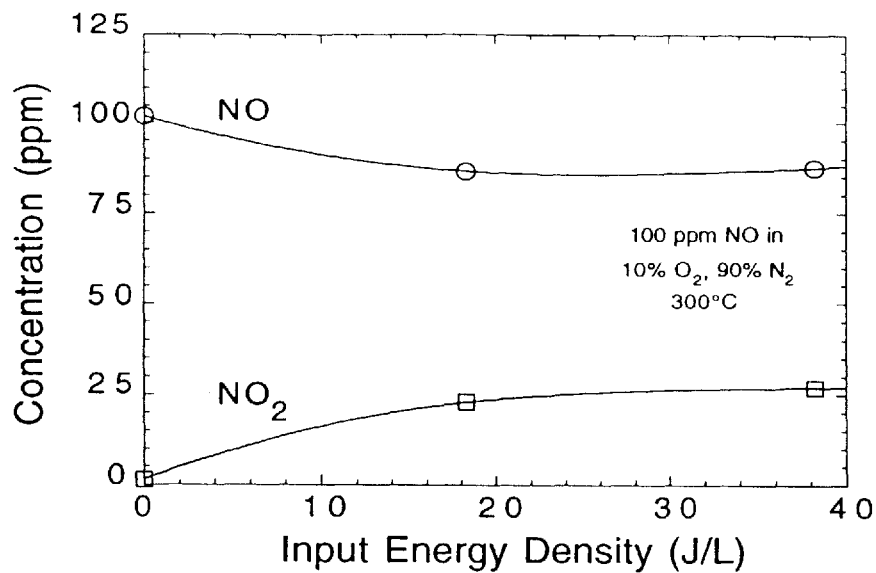
FIG. 6 is a graph showing the effect of plasma processing on the NO and $NO_2$ concentrations, at a gas temperature of 300° C. The inlet gas concentrations were 100 ppm NO in 10% $O_2$, 90% $N_2$.

FIG. 6 shows the experimental evidence for such for a gas temperature of 300° C.

Figure 7:
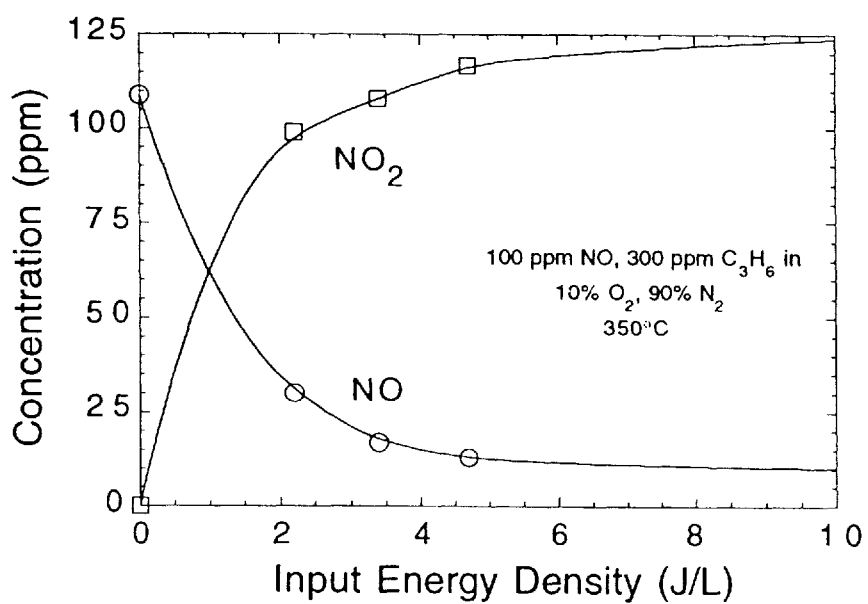
FIG. 7 is a graph showing hydrocarbon-enhanced oxidation of NO to $NO_2$ in a plasma, at a gas temperature of 350° C. The inlet gas concentrations were 100 ppm NO, 300 ppm $C_3H_6$ in 10% $O_2$, 90% $N_2$.

In the presence of hydrocarbons, the O radicals will react with the hydrocarbon molecules to produce very reactive hydrocarbon intermediates that can serve to enhance the oxidation of NO to $NO_2$ even at high gas temperatures. The decomposition of one $C_3H_6$ molecule by one O radical can lead to the oxidation of several NO molecules. Experimental evidence for propene-enhanced oxidation of NO to $NO_2$ in a plasma is shown in FIG. 7. In the presence of hydrocarbons, it is possible to oxidize a large fraction of the initial NO at high gas temperatures. Furthermore, the electrical energy required for the plasma oxidation process is small.

Figure 8:
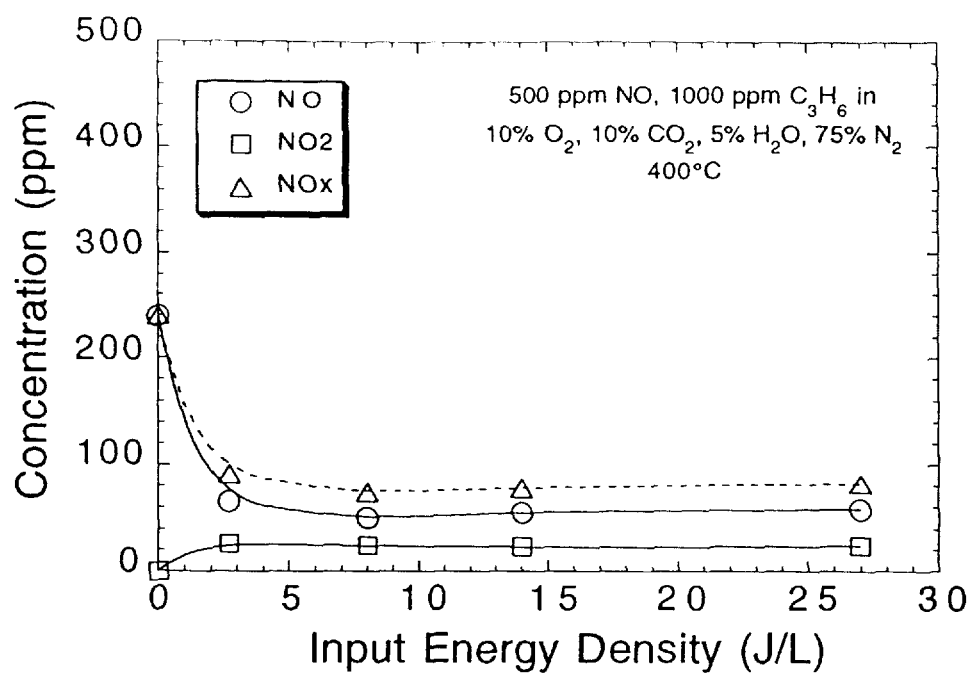
FIG. 8 is a graph showing Plasma-Assisted Catalytic Reduction of $NO_x$. The temperature was 400° C. The NO, $NO_2$ and total $NO_x$ ($NO+NO_2$) concentrations are shown as functions of the electrical energy density applied to the plasma. The inlet gas concentrations were 500 ppm NO, 1000 ppm $C_3H_6$ in 10% $O_2$, 10% $CO_2$, 5% $H_2O$, 75% $N_2$.

The combination of a plasma with known lean-$NO_x$ catalysts enhances the selective catalytic reduction of NO by hydrocarbons. FIG. 8 shows a typical result for the case in which both the plasma and catalyst are present. The NO, $NO_2$ and total $NO_x$ ($NO+NO_2$) concentrations are shown as functions of the electrical energy density applied to the plasma. The inlet gas concentrations were 500 ppm NO, 1000 ppm $C_3H_6$ in 10% $O_2$, 10% $CO_2$, 5% $H_2O$, 75% $N_2$. At zero energy input, there is no plasma. With the catalyst alone, about 250 ppm of the initial 500 ppm NO is reduced. The catalyst consisted simply of pellets of pure $\gamma$-$Al_2O_3$. As the electrical energy applied to the plasma is increased, some of the initial NO molecules are oxidized to $No_2$. Because of the high selective catalytic reduction activity of the catalyst with respect to $NO_2$, the amount of total $NO_x$ reduction increases. The plasma enhances the amount of total $NO_x$ reduction, and the enhancement increases as the electrical energy density applied to the plasma is increased. It is apparent that the enhancement in total $NO_x$ reduction by the catalyst is due to the conversion of NO to $NO_2$ in the plasma. With an input energy density of only 5 J/L, up to 80% $NO_x$ reduction could be achieved with the plasma-assisted catalytic reduction method.

There is some evidence suggesting that the $NO_x$ reduction process on the surface begins with the chemisorption of hydrocarbons and then the activation of these hydrocarbons through the formation of some intermediate species. The hydrocarbon intermediate may be char on the surface, a nitro compound, or an oxygenated exists for zeolite-basence exists for zeolite-based catalysts that the intermediate is a nitro compound. This is primarily deduced from surface infrared absorption studies allowing the reaction to take place in an in-situ cell. On Ce-ZSM-5, it was observed that the disappearance of the band associated with $CH_3NO_2$ was strongly correlated with the appearance of nitrogen. No other bands showed the same behavior. The surface nitro compound is suggested to react with $No_2$ rather than with NO to form $N_2$ and $N_2O$. Other suggestions are that the surface intermediate is a hydrocarbon-type char. Propene adsorbs and is, itself, converted to a char, while simultaneously reducing Cu from the II state to the I state. The NO then interacts in an unspecified fashion with the char to form nitrogen, carbon dioxide and oxygen. Temporal analysis of products for Cu-ZSM-5 also supports the formation of a char on the acidic sites which interacts with $NO_2$ adsorbed on the Cu sites to form the desired nitrogen product. In another case involving Cu-ZSM-5, oxygenated hydrocarbon species have been observed to promote the reduction of NO. On $\gamma$-$Al_2O_3$, the formation of carbonaceous deposits from hydrocarbon cracking was found to correlate with the selective catalytic reduction activity. Another proposal for the action of the hydrocarbon in $NO_x$ reduction is based on the temporal analysis of products for Pt on $\gamma$-$Al_2O_3$. Still others suggest that the primary purpose of the hydrocarbon is to reduce platinum, allowing the platinum to be oxidized by NO, thus producing nitrogen.

The final step in the reduction of $NO_x$ to $N_2$ has to include the pairing of the nitrogens. The main kinetic barrier to overcome in the catalytic reduction of $NO_x$ to $N_2$ is the coupling of nitrogens. The coupling mode probably depends on the type of catalyst. In a study of decomposition of NO over Cu-ZSM-5, the surface reactions appear to be complex, going through all of NO, $N_2O$ and $NO_2$ intermediates, before finally yielding nitrogen and oxygen. It is believed that the two N species get together over a single Cu site. The $N_xO_y$ species involved are all as surface intermediates adsorbed directly on the copper.

For the case of a simple oxide catalyst such as $\gamma$-$Al_2O_3$, the pairing between an $NO_2$ molecule striking from the gas and an adsorbed N-containing surface entity may be a conceivable pathway. The N-containing surface reactant could be in the form of an isocyanate intermediate or carbonaceous deposit.

A method embodiment of the present invention for reducing nitrogen oxides ($NO_x$) in engine exhausts comprises the steps of, (1) converting substantially all NO in an engine exhaust to an intermediate gas flow including $NO_2$, and (2) converting substantially all of said intermediate gas flow including $NO_2$ to an output gas flow comprising $NO_2$ conversion products of N2 and $O_2$ and substantially little $NO_x$. The $NO_x$-containing exhaust may be produced by other types of high-temperature combustion sources such as gas-fired burners, coal-fired power generators, and thermal incinerators. The step of converting substantially all NO in an exhaust to an intermediate gas flow including $NO_2$ can alternatively include the use of a plasma converter or a catalyst.

The step of converting substantially all of said intermediate gas flow including $NO_2$ to an output gas flow comprising little $NO_x$ can alternatively include the use of a SCR catalyst that is more active for reduction of $NO_2$ than of NO, or the use of a SCR catalyst with high surface area and high surface acidity, or one composed of a highly-acidic form of gamma alumina or silica. The SCR catalyst may also be composed of a base metal oxide or a supported noble metal catalyst.

The step of converting substantially all NO in an exhaust to an intermediate gas flow including $NO_2$ preferably includes the use of an electrical discharge plasma cell with one or more pair of electrodes to which high-voltage is provided. A voltage generation means for providing direct current, alternating current or pulsed high voltage waveform is connected to the electrodes. The gases to be treated are conducted through the volume between or in the vicinity of the electrodes.

The step of converting substantially all NO in an exhaust to an intermediate gas flow including $NO_2$ can alternatively include the use of an electron beam-generated plasma cell with an electron gun having a thermionic or cold plasma cathode. A voltage generation means is included to provide direct current, alternating current or pulsed voltage waveform to the electron gun. The vacuum provided for the electron gun must be separated from the high pressure region with the gases that are processed but still allow the gasses to be irradiated. A solid dielectric-barrier material can used adjacent to one or more of the high-voltage electrodes.

Alternatively, a liquid layer can be used adjacent to one or more of the high-voltage electrodes to act as a dielectric-barrier and/or a process product scrubber. The high-voltage electrodes can be imbedded within a solid dielectric such that a surface discharge plasma is produced. The volume between one or more pairs of electrodes can be packed with dielectric pellets or glass wool, or other dielectric materials, that allow the gas to pass through the volume. The electrodes can also be coated with a layer of catalytic material and/or mechanically articulated to vary the electrode gap between points on the surface of opposing electrodes. The dielectric material used can be an oxidation catalyst that converts NO in an exhaust to an intermediate gas flow including $NO_2$, or a SCR catalyst that converts $NO_2$ formed in the plasma to a gas flow containing less $NO_x$.

The step of converting substantially all NO in an exhaust to an intermediate gas flow including $NO_2$ may also include the use of a plasma converter functioning as an electrostatic precipitator or particulate trap, or that oxidizes carbonaceous particles, such as soot, to carbon oxides (COx) and $H_2O$. A reactive gas can be introduced to enhance the oxidation of NO to $NO_2$, or $NO_2$ to $N_2$ and $O_2$.

The hydrocarbons mentioned herein, may be selected from the group of alkanes, alkenes, alkynes, aromatics, alcohols, aldehydes, ketones, ethers, and esthers.

Nitrogen-containing reductants such as ammonia, urea or cyanuric acid can be introduced in the step of converting substantially all of the intermediate gas flow including $NO_2$ to an output gas flow.

The step of converting substantially all NO in an exhaust to an intermediate gas flow including $NO_2$ may include the use of a solid electrochemical cell having one or more pair of electrodes to which low-voltage is provided, a voltage generation means providing direct current, alternating current or pulsed low voltage waveform to the electrodes, and conducting the gases to be treated through the volume in the vicinity of the electrodes.

Figure 9:
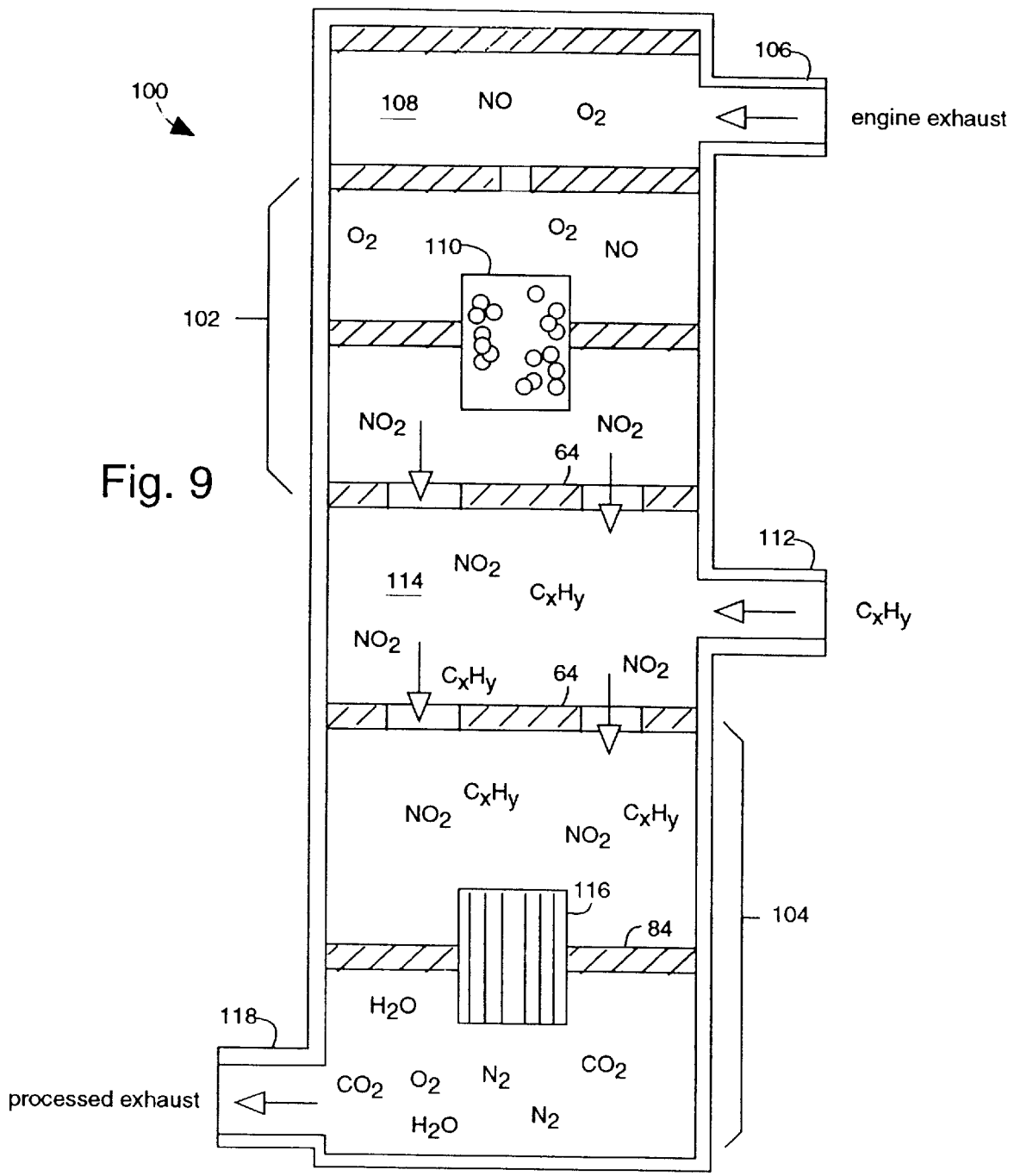
FIG. 9 is a cross-section diagram of a $NO_x$ reduction embodiment of the present invention.

In FIG. 9 a two-stage catalyst 100 comprises an oxidative stage 102 and a reductive stage 104. The first stage 102 is intended to convert NO to $NO_2$ in the presence of $O_2$. The second stage 104 serves to convert $NO_2$ to environmentally benign gases that include N2, CO2, and $H_2O$. By preconverting NO to $NO_2$ in the first stage 102, the efficiency of the second stage 104 for $No_x$ reduction is enhanced. For example, an internal combustion engine exhaust is connected by a pipe 106 to a first chamber 108. An oxidizing first catalyst 110 converts NO to $NO_2$ in the presence of $O_2$ and includes platinum/alumina, e.g., $Pt/Al_2O_3$ catalyst. A flow of hydrocarbons ($C_xH_y$) is input from a pipe 112 into a second chamber 114. For example, propene can be used as a source of hydrocarbons. The $NO_2$ from the first catalyst 110 mixes with the hydrocarbons in the second chamber 114. The mixture proceeds to a second reduction catalyst 116 that converts $NO_2$ to N2, CO2, and $H_2O$, and includes a gamma-alumina $\gamma$-$Al_2O_3$. The hydrocarbons and $NO_x$ are simultaneously reduced while passing through the second catalyst 116. The processed exhaust then passes through pipe 118.

In experiments that were conducted, the influent gas temperature was about 300° C., and had 500 ppm NO, 10% $O_2$, and was balanced with N2 at twenty standard liters per minute. After passing through the first catalyst 102, about 90% of the NO was oxidized to $NO_2$. About 500 ppm propene was injected to the $NO_2$-containing gas stream. A total $NO_x$ reduction of about 80% was achieved after passing through the second stage 104. For comparison, without the first catalyst 102, and under the same conditions, the reduction was only 14%.

In another experiment, the influent gas temperature was about 300° C., and had 1000 ppm NO, 10% $O_2$, and was balanced with N2 at twenty standard liters per minute. After passing through the first catalyst 110, about 90% of the NO was oxidized to $NO_2$. About 1000 ppm propene was injected to the $NO_2$-containing gas stream. Again, a total $NO_x$ reduction of about 80% was achieved after passing through the second stage 104. The amount of propene was reduced to 500 ppm, and there was no significant degradation in the total $NO_x$ reduction.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for reducing nitrogen oxides ($NO_x$) in engine exhausts from oxygen-rich, high-temperature combustion, the method comprising the steps of:

converting substantially all NO in an oxygen-rich engine exhaust with a first stage oxidizing catalyst to an intermediate gas flow including $NO_2$;

adding hydrocarbons into the intermediate gas flow; and converting substantially all of said intermediate gas flow including $NO_2$ in the presence of hydrocarbons with a second-stage selective catalytic reduction (SCR) catalyst to an output gas flow comprising $NO_2$ conversion products of $N_2$, $CO_2$ and $H_2O$ and substantially little NO and $NO_2$ ($NO_x$);

wherein, the first stage oxidizing catalyst is used to convert NO to $NO_2$ and then the second-stage selective catalytic reduction (SCR) catalyst is used to convert $NO_2$ and the hydrocarbons to $N_2$, $CO_2$, and $H_2O$.

2. A two-stage catalytic converter, comprising:

an oxygen-rich engine-exhaust gas inlet;

an oxidative first stage including a first catalyst that serves to convert NO to $NO_2$ in the presence of excess $O_2$ and is connected to the oxygen-rich exhaust gas inlet;

a hydrocarbon inlet; and a reductive second stage including a second catalyst connected to the oxidative first stage and the hydrocarbon inlet to receive a mixture of $NO_2$ from the oxidative first stage and hydrocarbons from the hydrocarbon inlet, and that further serves to convert $NO_2$ to gases that include $N_2$, $CO_2$, and $H_2O$;

wherein by preconverting NO to $NO_2$ in the first stage, the efficiency of the second stage for $NO_x$ reduction is enhanced.

3. The converter of claim 2, wherein:

the first catalyst of the oxidizing first stage includes a platinum/alumina catalyst ($Pt/Al_2O_3$).

4. The converter of claim 2, wherein:

the second catalyst of the reductive second stage includes a gamma-alumina catalyst ($\gamma$-$Al_2O_3$);

wherein hydrocarbons and $NO_x$ are simultaneously reduced while passing through the second stage.

* * * * *